(12) United States Patent
Nishimura

(10) Patent No.: US 10,960,947 B2
(45) Date of Patent: Mar. 30, 2021

(54) SADDLED VEHICLE

(71) Applicant: Honda Motor Co., Ltd., Tokyo (JP)

(72) Inventor: Masaki Nishimura, Kumamoto (JP)

(73) Assignee: HONDA MOTOR CO., LTD., Tokyo (JP)

( * ) Notice: Subject to any disclaimer, the term of this patent is extended or adjusted under 35 U.S.C. 154(b) by 253 days.

(21) Appl. No.: 16/368,544

(22) Filed: Mar. 28, 2019

(65) Prior Publication Data

US 2019/0300083 A1  Oct. 3, 2019

(30) Foreign Application Priority Data

Mar. 29, 2018  (JP) .............................. JP2018-065467

(51) Int. Cl.
*B62H 5/02* (2006.01)
*B62K 21/04* (2006.01)
(Continued)

(52) U.S. Cl.
CPC .............. *B62H 5/02* (2013.01); *B62K 19/32* (2013.01); *B62K 21/02* (2013.01); *B62K 21/04* (2013.01); *B62K 21/12* (2013.01); *B62K 21/18* (2013.01)

(58) Field of Classification Search
CPC ... B62H 5/02; B62H 5/04; B62H 5/06; B62K 19/32; B62K 21/02; B62K 21/04; B62K 21/18; B62K 21/12
(Continued)

(56) References Cited

U.S. PATENT DOCUMENTS 7,509,826 B2 *  3/2009  Niedrig .................. B60R 25/00
                                                    70/185
7,845,449 B2 * 12/2010  Miyamoto ............... B62H 5/04
                                                    180/219
(Continued)

FOREIGN PATENT DOCUMENTS

CN      201300920 Y    9/2009
JP        5095486 B2  12/2012
JP      2016-205081 A 12/2016

OTHER PUBLICATIONS

Indian Office Action for Indian Application No. 201914004035, dated Jul. 15, 2020, with English translation.

*Primary Examiner* — Minnah L Seoh
*Assistant Examiner* — Hosam Shabara
(74) *Attorney, Agent, or Firm* — Birch, Stewart, Kolasch & Birch, LLP

(57) ABSTRACT

A saddled vehicle includes a steering stem inserted into a center part of a top bridge and having an upper end to be fixed to the top bridge with a fastening member. The saddled vehicle includes a handle locking device placed behind the top bridge in the vehicle front-rear direction. The handle locking device has a locking member and the top bridge includes a retaining recess on the rear face for detachable engagement with the locking member. The center part of the top bridge has a through hole for penetration of the steering stem and a storage recess that stores the upper end of the steering stem and the fastening member and is open toward the upper face of the top bridge. The storage recess continues to the upper part of the through hole while having a bottom that faces upward and is located between the through hole and the wall of the storage recess. The top bridge has a drainage hole connecting the storage recess and the retaining recess.

10 Claims, 6 Drawing Sheets

(51) Int. Cl.
*B62K 21/18* (2006.01)
*B62K 21/02* (2006.01)
*B62K 19/32* (2006.01)
*B62K 21/12* (2006.01)

(58) Field of Classification Search
USPC .................................. 280/271, 272; 70/233
See application file for complete search history.

(56) References Cited

U.S. PATENT DOCUMENTS

| | | | |
|---|---|---|---|
| 8,141,892 B2 * | 3/2012 | Nakanishi | B62H 5/02 |
| | | | 280/271 |
| 2010/0223967 A1 | 9/2010 | Nakanishi et al. | |

* cited by examiner

SADDLED VEHICLE

BACKGROUND

1. Technical Field

The present invention relates to a saddled vehicle having a vehicle body frame including a head pipe at a front end that supports a steering stem in a steerable manner, the steering stem having an axis that is inclined rearward upward, the front fork including a top bridge to fix a steering handle, the steering stem being inserted into a center part of the top bridge in a vehicle width direction and having an upper end fixed to the top bridge with a fastening member, the vehicle body frame supporting a handle locking device behind the top bridge in a vehicle front-rear direction, the handle locking device including a locking member that detachably engages a retaining recess disposed at a rear face of the top bridge.

2. Description of the Background

Patent Literature 1 discloses such a saddled vehicle.

CITATION LIST

Patent Literature

[Patent Literature 1] JP 2016-205081 A

BRIEF SUMMARY

Patent Literature 1 discloses a steering stem that penetrates through a center part of the top bridge in the vehicle width direction, and a nut threadably engaging the upper end of the steering stem that protrudes upward from the top bridge. Such a nut protrudes upward from the top bridge, and so a part around the nut is not protected, and the appearance also may not be good.

In view of the foregoing, the present invention aims to provide a saddled vehicle that protects a steering stem at a part to be fixed to a top bridge and enhances the aesthetic appearance of the part and that is durable at the part.

To achieve the aim, a saddled vehicle of the present invention has a first feature that the saddled vehicle includes a vehicle body frame including a head pipe at a front end, the vehicle body frame supporting a steering stem in a steerable manner, the steering stem having an axis that is inclined rearward upward, a front fork including a top bridge to fix a steering handle, the top bridge having a center part in a vehicle width direction for insertion of the steering stem, the steering stem having an upper end fixed to the top bridge with a fastening member; and a handle locking device supported by the vehicle body frame and that is located behind the top bridge in a vehicle front-rear direction, the handle locking device including a locking member that detachably engages a retaining recess disposed at a rear face of the top bridge, wherein the center part of the top bridge in the vehicle width direction has a through hole for penetration of the steering stem and a storage recess that stores the upper end of the steering stem and the fastening member and is open toward the upper face of the top bridge, the storage recess continues to an upper part of the through hole and has a bottom and a wall while having the bottom that faces upward and is located between the through hole and the wall of the storage recess, and the top bridge has a drainage hole connecting the storage recess and the retaining recess.

In addition to the first feature, the saddled vehicle of the present invention has a second feature that the through hole and the storage recess have round transverse sections having the same axis as the axis of the steering stem, and the retaining recess extends radially relative to the axis of the steering stem, and the storage recess and the retaining recess communicate through the drainage hole that extends radially relative to the axis of the steering stem.

In addition to the first or second feature, the saddled vehicle of the present invention has a third feature that the bottom is a plane along an imaginary plane that is orthogonal to the axis of the steering stem, and a nut as the fastening member threadably engages an external thread engraved on the circumference of the upper end of the steering stem to abut and engage the bottom.

In addition to the third feature, the saddled vehicle of the present invention has a fourth feature that the locking member is a pin-like member that has an axis on the imaginary plane and protrudes from the handle locking device to the retaining recess.

In addition to any one of the first to fourth features, the saddled vehicle of the present invention has a fifth feature that the front fork includes a pair of cushion units that extends parallel to the steering stem and is placed on the left and right of a front wheel, and the top bridge has a pair of left and right fork supports that couples upper ends of the cushion units and has the drainage hole that is offset rearward from rear ends of the pair of left and right fork supports when the vehicle moves straight forward.

According to the first feature of the present invention, the storage recess of the top bridge that is open toward the upper face of the top bridge stores the upper end of the steering stem and the fastening member. This configuration protects the steering stem at a part to be fixed to the top bridge and enhances the aesthetic appearance of the part. This also makes the steering stem and the fastening member durable because the drainage hole connecting the storage recess and the retaining recess discharges water in the storage recess to the outside through the retaining recess.

According to the second feature of the present invention, the through hole and the storage recess of the top bridge have round transverse sections having the same axis as the axis of the steering stem, and the retaining recess and the drainage hole extend radially relative to the axis of the steering stem. This increases the rigidity around the steering stem of the top bridge and connects the storage recess and the retaining recess in a shortest distance through the drainage hole, and so decreases the influences from the drainage hole on the rigidity of the top bridge.

According to the third feature of the present invention, the bottom between the through hole and the wall of the storage recess in the top bridge is the plane along the imaginary plane that is orthogonal to the axis of the steering stem. In this way, while the axis of the steering stem is inclined rearward upward, the imaginary plane and the bottom are inclined rearward downward. This easily collects water in the storage recess to a rear part of the storage recess along the bottom where the nut is tightened, and the drainage hole leading to this rear part of the storage recess easily discharges the water. As a result, the durability around the part increases. When the motorcycle is parked, the bottom is inclined rearward downward. This easily discharges water in the storage recess to the outside through the drainage hole and the retaining recess that are located at a rear part of the top bridge, and so discharges water stored there during the parking of the motorcycle for a long time as well.

According to the fourth feature of the present invention, the locking member is a pin-like member that has the axis on the above-stated imaginary plane and protrudes from the handle locking device to the retaining recess. In this way, the locking member is on the same level as the bottom of the storage recess, and so the retaining recess also is on the same level as the bottom. This makes the top bridge lighter in weight.

According to the fifth feature of the present invention, the front fork includes the pair of cushion units, and the top bridge has the pair of left and right fork supports that couples upper ends of these cushion units. The top bridge has the drainage hole that is offset rearward from the rear ends of these fork supports when the vehicle moves straight forward. This avoids the influences from the drainage hole on the fork supports that receive reactive force from the front wheel, and so the fork supports support the front fork well.

DETAILED DESCRIPTION

The following describes an embodiment of the present invention with reference to the attached FIG. 1 to FIG. 6. The following descriptions refer to directional terms such as up and down, front and rear and left and right relative to the viewing direction of the passenger riding on the motorcycle.

Figure 1:
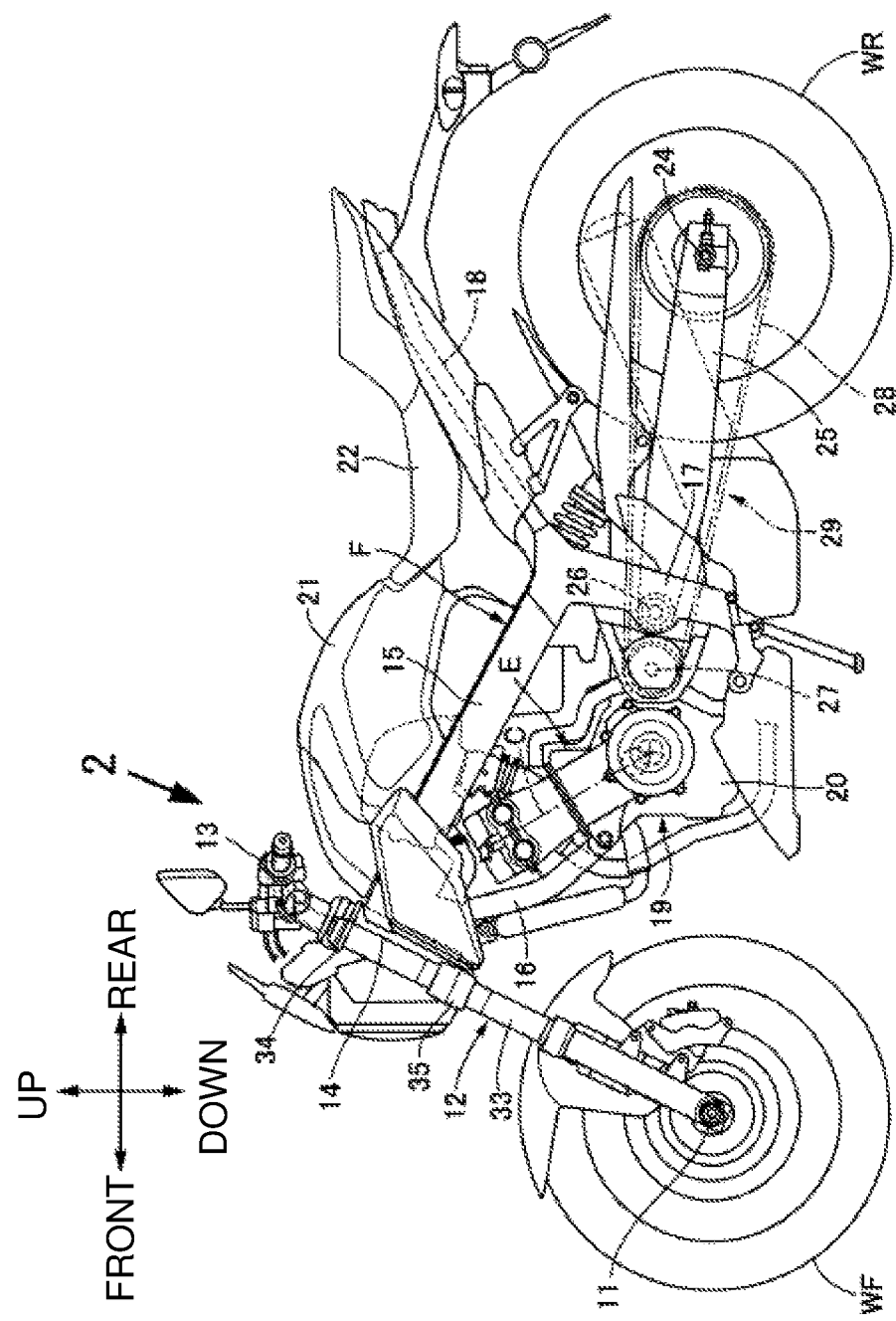
FIG. 1 is a left side view of a motorcycle.

Referring firstly to FIG. 1, a motorcycle as a saddled vehicle has a vehicle body frame F. The vehicle body frame F includes a head pipe 14, a pair of left and right main frames 15, a down frame 16, a pair of left and right pivot frames 17, and a pair of left and right seat rails 18. The head pipe 14 supports a front fork 12 that rotatably supports a front axle 11 of a front wheel WF at the lower end, and supports a bar-like steering handle 13 in a steerable manner. The main frames 15 extend rearward downward from the head pipe 14. The down frame 16 extends rearward downward from the head pipe 14 at a steeper angle than that of the main frames 15. The pivot frames 17 continue to the rear ends of the main frames 15 and extend downward. The seat rails 18 extend rearward upward from the upper ends of the pivot frames 17.

The vehicle body frame F supports an engine body 19 of an engine E below the main frames 15, and the engine E generates driving force to drive a rear wheel WR. The main frames 15 support a fuel tank 21 so that the fuel tank covers the engine E from the above. The seat rails 18 support a seat 22 that is located behind the fuel tank 21.

Each pivot frame 17 supports a front end of a swing arm 25 swingably via a spindle 26, and the swing arm 25 pivotably supports a rear axle 24 of the rear wheel WR at the rear end. In the engine body 19, a crankcase 20 internally has a transmission (not illustrated) so that the end of the output shaft 27 of the transmission protrudes from the left side face of the crankcase 20. The motorcycle has a transmission mechanism 29 including an endless drive chain 28 between the output shaft 27 and the rear axle 24 of the rear wheel WR.

Figure 2:
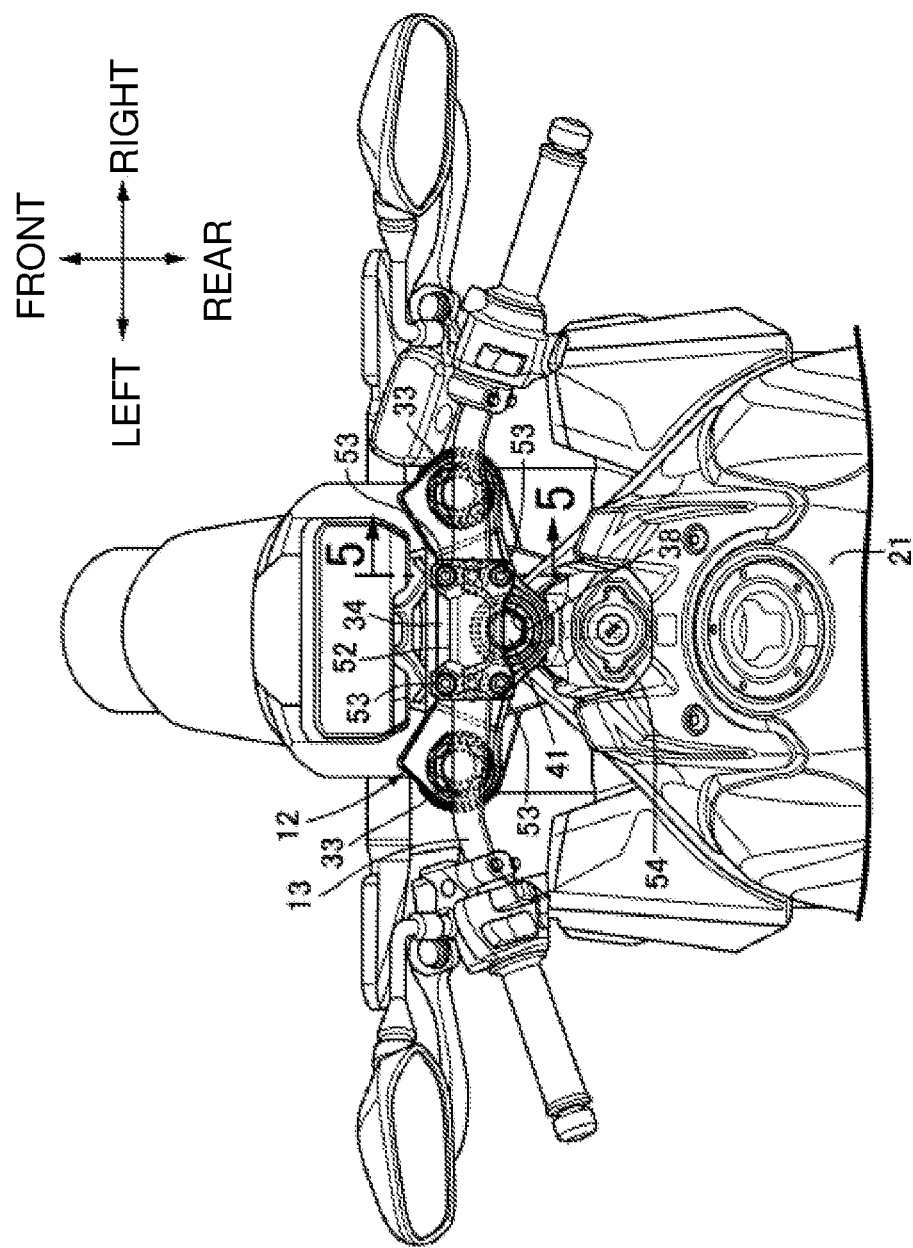
FIG. 2 is a view along arrow 2 of FIG. 1.
Figure 3:
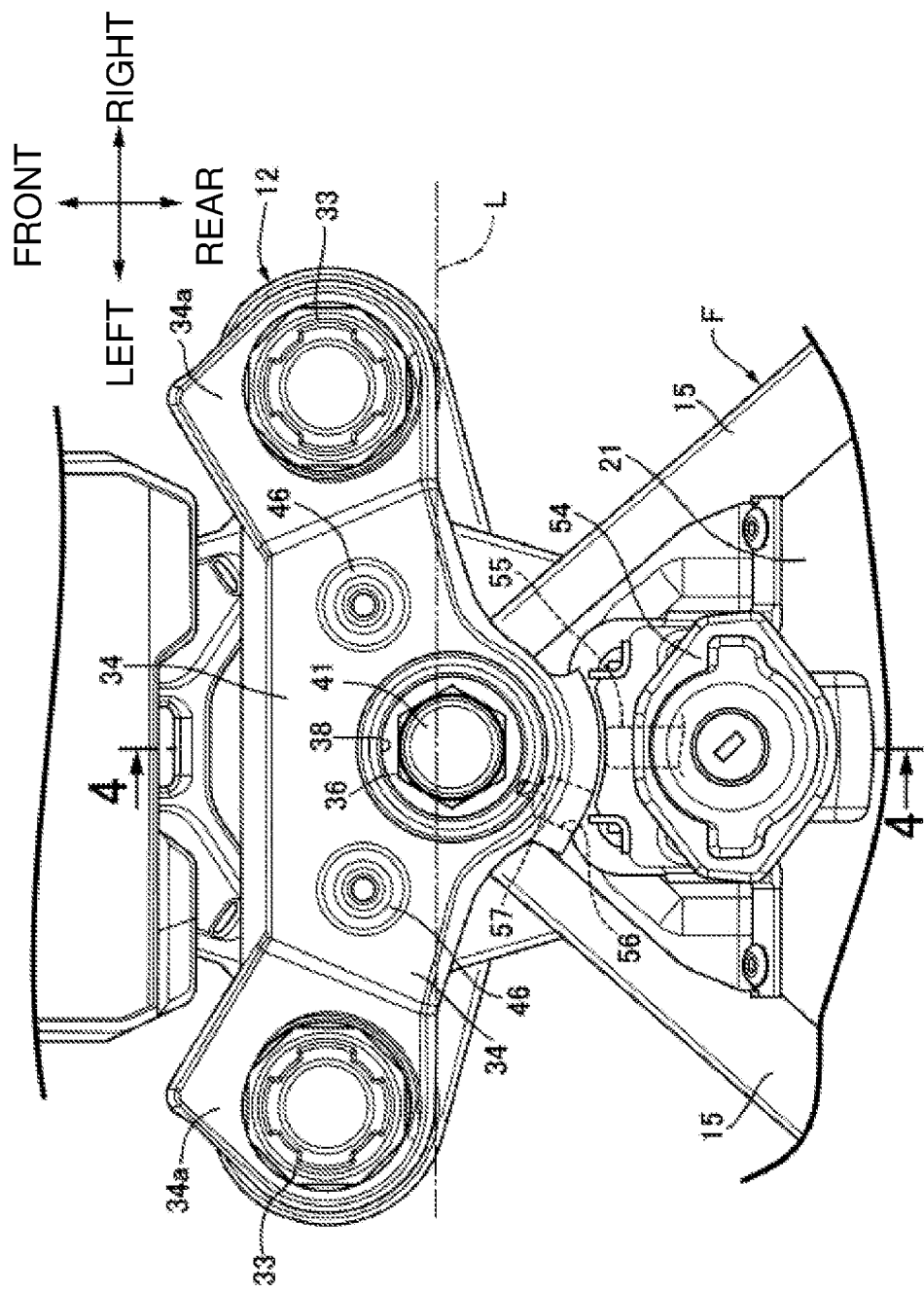
FIG. 3 is an enlarged view of the major part other than the steering handle of FIG. 2.
Figure 4:
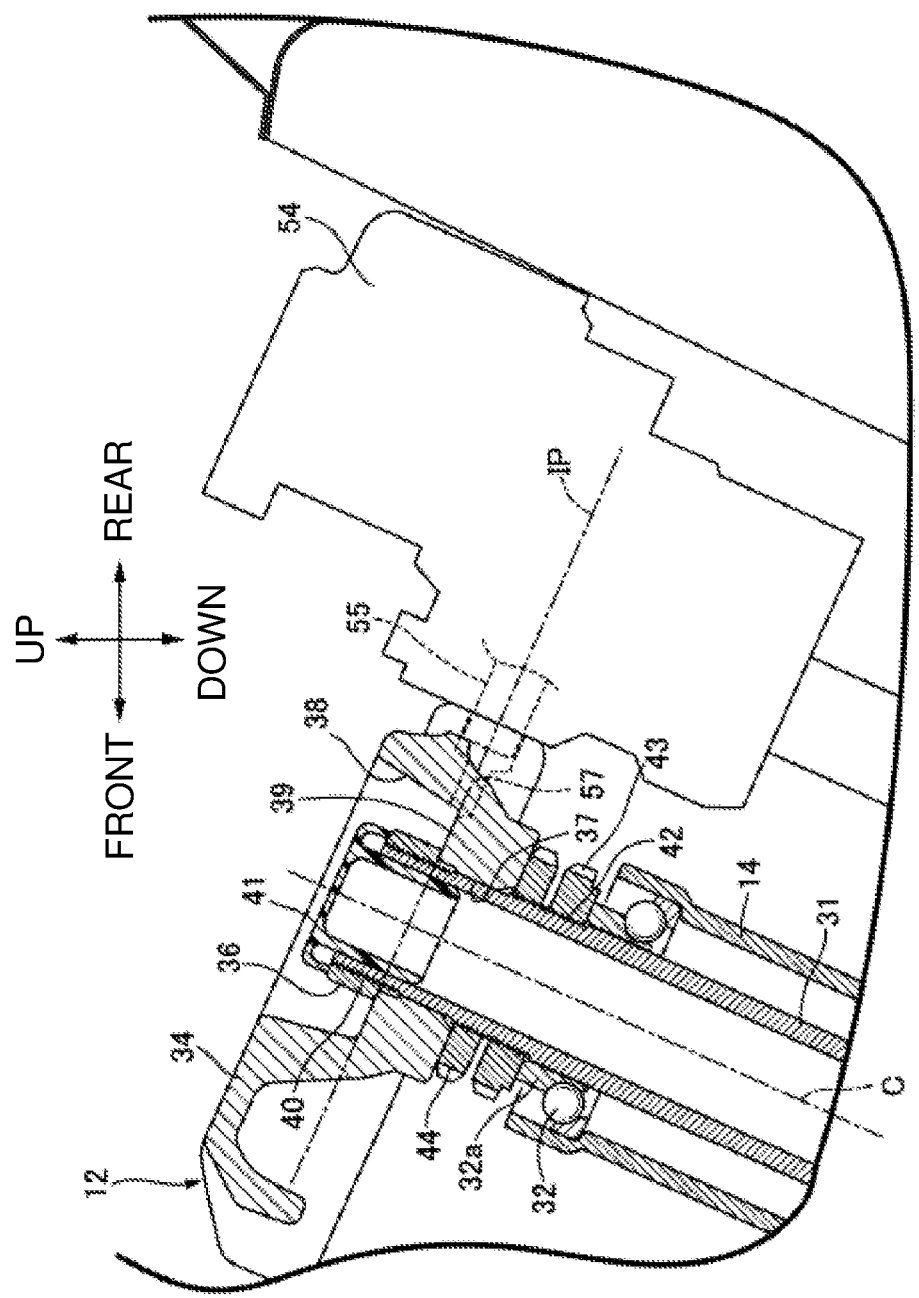
FIG. 4 is a cross-sectional view along the line 4-4 of FIG. 3.

Referring also to FIG. 2 to FIG. 4, the head pipe 14 supports a cylindrical steering stem 31 in a steerable manner. The steering stem 31 has an axis C that is inclined rearward upward, and penetrates through the head pipe 14. A ball bearing 32 intervenes between the upper end of the head pipe 14 and the steering stem 31.

The front fork 12 includes a pair of cushion units 33 having an axis C that is parallel to the axis C of the steering stem 31 and placed on the left and right of the front wheel WF, a top bridge 34 that joins upper ends of these cushion units 33, and a bottom bridge 35 (see FIG. 1) that joins these pair of left and right cushion units 33 below the head pipe 14.

The upper end of the steering stem 31 is fixed to a center part of the top bridge 34 in the vehicle width direction with a first nut 36 as a fastening member. To this end, the center part of the top bridge 34 in the vehicle width direction has a through hole 37 for penetration of the steering stem 31, and has a storage recess 38 that stores the upper end of the steering stem 31 and the first nut 36 and is open toward the upper face of the top bridge 34. The storage recess 38 continues to the upper part of the through hole 37 while having a bottom 39 that faces upward and is located between the through hole 37 and the wall of the storage recess 38.

The through hole 37 and the storage recess 38 have round transverse sections having the same axis as the axis C of the steering stem 31 and are coaxially and continuously arranged, and the bottom 39 is a plane along the imaginary plane IP that is orthogonal to the axis C of the steering stem 31.

The steering stem 31 has a first external thread 40 engraved on the circumference of the upper end. The first nut 36 threadably engages the first external thread 40 to abut and engage the bottom 39. A resin cap 41 is then attached to the upper end of the steering stem 31 so as to close the upper end of the cylindrical steering stem 31.

The steering stem 31 has a second external thread 42 engraved on the circumference at a part between the top bridge 34 and the head pipe 14. This second external thread 42 threadably engages a first lock nut 43 and a second lock nut 44 with an interval therebetween in the direction along the axis C of the steering stem 31. The first lock nut 43 abuts and engages the inner race 32a of the ball bearing 32, and the second lock nut 44 abuts and engages the lower face of the top bridge 34.

Figure 5:
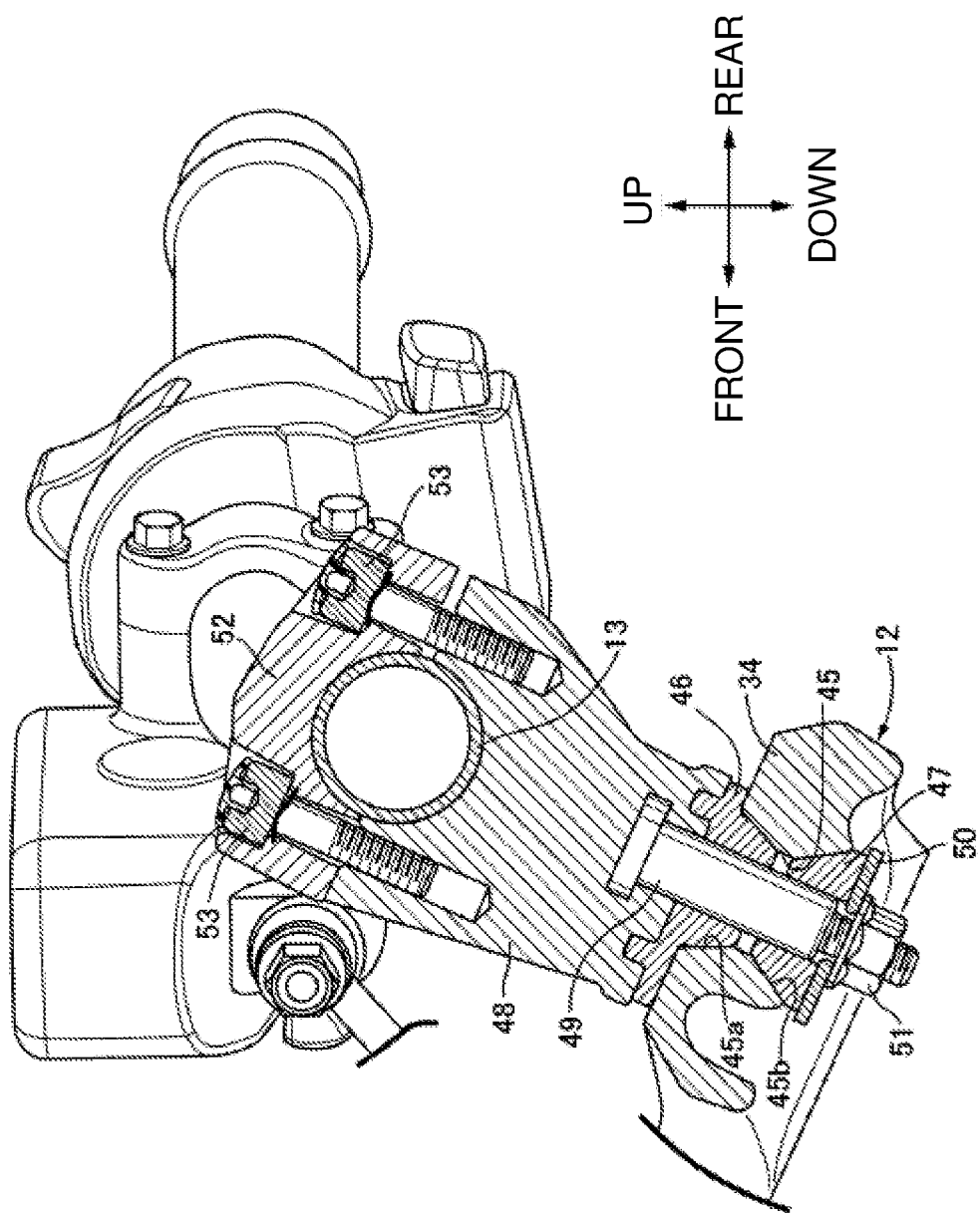
FIG. 5 is a cross-sectional view along the line 5-5 of FIG. 2.

Referring also to FIG. 5, the top bridge 34 has insertion holes 45 on the left and right of the through hole 37 and the storage recess 38 so as to fix the steering handle 13 to the top bridge 34. Each insertion hole 45 has an upper tapered hole 45a at the upper part that expands in the upward direction and a lower tapered hole 45b at the lower part that expands in the downward direction.

The upper tapered hole 45a of the insertion hole 45 is to insert a first rubber 46, and the lower tapered hole 45b is to insert a second rubber 47. Lower holders 48 are placed on both sides of the storage recess 38, and each lower holder 48 has a first bolt 49 that is coupled to the lower holder during molding. This first bolt 49 is inserted into the corresponding insertion hole 45 so as to penetrate through the first and second rubbers 46 and 47, and then the first bolt 49 threadably engages a second nut 51 that abuts and engages a washer 50 in contact with the second rubber 47 under the top bridge 34. Tightening with this second nut 51 fixes the lower holder 48 to the top bridge 34.

Each of these left and right lower holders 48 as a pair and a corresponding upper holder 52 are fastened with a pair of second bolts 53 for each lower holder 48 so as to pinch the steering handle 13 between the lower and upper holders. This fixes the steering handle 13 to the top bridge 34 via the upper holders 52 and the lower holders 48.

Figure 6:
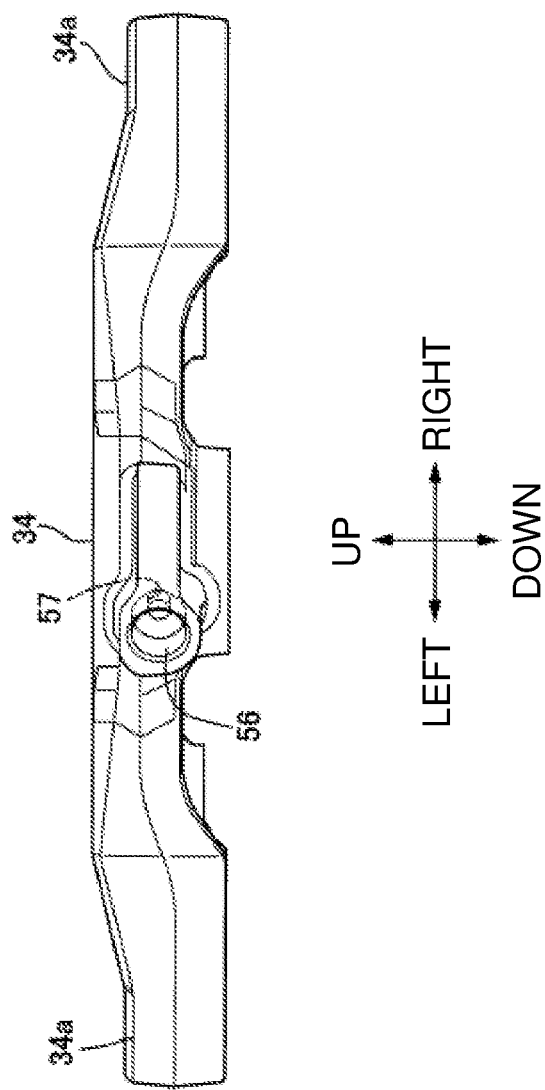
FIG. 6 shows a top bridge viewed from the rear in the vehicle front-rear direction.

Referring also to FIG. 6, the vehicle body frame F supports a handle locking device 54 behind the top bridge 34 in the vehicle front-rear direction. This handle locking device 54 moves a locking member 55 toward or away from the top bridge 34 in response to user's operation of a mechanical key not illustrated. The top bridge 34 has a retaining recess 56 on the rear face for detachable engagement with the locking member 55. This retaining recess 56 detachably engages the locking member 55 when the motorcycle is parked while turning the steering handle 13 left. When the steering handle 13 is directed so as to move the motorcycle straight forward, the retaining recess 56 is placed on the rear face of the top bridge 34 while being open toward the obliquely left and rearward.

The top bridge 34 has a drainage hole 57 bored between the storage recess 38 and the retaining recess 56. The retaining recess 56 extends radially relative to the axis C of the steering stem 31, and the storage recess 38 and the retaining recess 56 communicate through the drainage hole 57 that extends radially relative to the axis C of the steering stem 31. The locking member 55 is a pin-like member that has an axis C on the above-stated imaginary plane IP and protrudes from the handle locking device 54 to the retaining recess 56.

The top bridge 34 has a pair of left and right fork supports 34a on the left and right edges in the vehicle width direction so as to couple the upper ends of the pair of left and right cushion units 33 of the front fork 12. When the vehicle moves straight forward, the drainage hole 57 of the top bridge 34 is offset rearward from the rear ends of the pair of left and right fork supports 34a. In other words, in the plan view of FIG. 3, the drainage hole 57 of the top bridge 34 is offset rearward from the imaginary line L that connects the rear ends of the pair of left and right fork supports 34a when the vehicle moves straight forward.

Next the following describes the advantageous effects of the present embodiment. The center part of the top bridge 34 in the vehicle width direction has the through hole 37 for penetration of the steering stem 31 and has the storage recess 38 that stores the upper end of the steering stem 31 and the first nut 36 and is open toward the upper face of the top bridge 34. The storage recess 38 continues to the upper part of the through hole 37 while having the bottom 39 that faces upward and is located between the through hole 37 and the wall of storage recess 38. The top bridge 34 has the drainage hole 57 connecting the storage recess 38 and the retaining recess 56. This configuration protects the steering stem 31 at a part to be fixed to the top bridge 34 and enhances the aesthetic appearance of the part. This also makes the steering stem 31 and the first nut 36 durable because the drainage hole 57 connecting the storage recess 38 and the retaining recess 56 discharges water in the storage recess 38 to the outside through the retaining recess 56.

The through hole 37 and the storage recess 38 have round transverse sections having the same axis as the axis of the steering stem 31. The retaining recess 56 extends radially relative to the axis C of the steering stem 31. The storage recess 38 and the retaining recess 56 communicate through the drainage hole 57 that extends radially relative to the axis C of the steering stem 31. This increases the rigidity around the steering stem 31 of the top bridge 34 and connects the storage recess 38 and the retaining recess 56 in a shortest distance through the drainage hole 57, and so decreases the influences from the drainage hole 57 on the rigidity of the top bridge 34.

The bottom 39 is on the plane along the imaginary plane IP that is orthogonal to the axis C of the steering stem 31, and the first nut 36 threadably engages the first external thread 40 engraved on the circumference of the upper end of the steering stem 31 to abut and engages the bottom 39. In this way, while the axis C of the steering stem 31 is inclined rearward upward, the imaginary plane IP and the bottom 39 are inclined rearward downward. This easily collects water in the storage recess 38 to a rear part of the storage recess 38 along the bottom 39 where the first nut 36 is tightened, and the drainage hole 57 leading to this rear part of the storage recess 38 easily discharges the water. As a result, the durability around the part increases. When the motorcycle is parked, the bottom 39 is inclined rearward downward. This easily discharges water in the storage recess 38 to the outside through the drainage hole 57 and the retaining recess 56 that are located at a rear part of the top bridge 34, and so discharges water stored there during the parking of the motorcycle for a long time as well.

The locking member 55 is a pin-like member that has the axis on the above-stated imaginary plane IP and protrudes from the handle locking device 54 to the retaining recess 56. In this way, the locking member 55 is on the same level as the bottom 39 of the storage recess 38, and so the retaining recess 56 also is on the same level as the bottom 39. This makes the top bridge 34 lighter in weight.

The front fork 12 includes the pair of cushion units 33 that extends parallel to the steering stem 31 and is placed on the left and right of the front wheel WF, and the top bridge 34 has the pair of left and right fork supports 34a that couples the upper ends of these cushion units 33. The top bridge 34 has the drainage hole 57 that is offset rearward from the rear ends of the pair of left and right fork supports 34a when the vehicle moves straight forward. This avoids the influences from the drainage hole 57 on the fork supports 34a that receive reactive force from the front wheel WF, and so the fork supports 34a support the front fork 12 well.

While the present invention has been disclosed by way of a certain embodiment, the present invention is not limited to the above embodiment. Numerous modifications are possible for the design without departing from the present invention as defined in the appended claims.

REFERENCE SIGNS LIST

12 . . . Front fork
13 . . . Steering handle
14 . . . Head pipe
31 . . . Steering stem
33 . . . Cushion unit
34 . . . Top bridge
34a . . . Fork support
36 . . . First nut as fastening member
37 . . . Through hole
38 . . . Storage recess
39 . . . Bottom
40 . . . External thread
54 . . . Handle locking device
55 . . . Locking member
56 . . . Retaining recess
57 . . . Drainage hole
C . . . Axis of steering stem
IP . . . Imaginary plane
F . . . Vehicle body frame

What is claimed is:

1. A saddled vehicle comprising:
a vehicle body frame including a head pipe at a front end, the vehicle body frame supporting a steering stem in a steerable manner, the steering stem having an axis that is inclined rearward upward,
a front fork including a top bridge to fix a steering handle, the top bridge having a center part in a vehicle width direction for insertion of the steering stem, the steering stem having an upper end fixed to the top bridge with a fastening member; and
a handle locking device supported by the vehicle body frame and that is located behind the top bridge in a vehicle front-rear direction, the handle locking device including a locking member that detachably engages a retaining recess disposed at a rear face of the top bridge,
wherein the center part of the top bridge in the vehicle width direction has a through hole for penetration of the steering stem and a storage recess that stores the upper end of the steering stem and the fastening member and is open toward the upper face of the top bridge, the storage recess continues to an upper part of the through hole and has a bottom and a wall while having the bottom that faces upward and is located between the through hole and the wall of the storage recess, and the top bridge has a drainage hole connecting the storage recess and the retaining recess.

2. The saddled vehicle according to claim 1, wherein
the through hole and the storage recess have round transverse sections having the same axis as the axis of the steering stem,
the retaining recess extends radially relative to the axis of the steering stem, and
the storage recess and the retaining recess communicate through the drainage hole that extends radially relative to the axis of the steering stem.

3. The saddled vehicle according to claim 1, wherein
the bottom is a plane along an imaginary plane that is orthogonal to the axis of the steering stem, and
a nut as the fastening member threadably engages an external thread engraved on the circumference of the upper end of the steering stem to abut and engage the bottom.

4. The saddled vehicle according to claim 3, wherein the locking member is a pin-like member that has an axis on the imaginary plane and protrudes from the handle locking device to the retaining recess.

5. The saddled vehicle according to claim 1, wherein
the front fork includes a pair of cushion units that extends parallel to the steering stem and is placed on the left and right of a front wheel, and
the top bridge has a pair of left and right fork supports that couples upper ends of the cushion units and has the drainage hole that is offset rearward from rear ends of the pair of left and right fork supports when the vehicle moves straight forward.

6. The saddled vehicle according to claim 2, wherein
the bottom is a plane along an imaginary plane that is orthogonal to the axis of the steering stem, and
a nut as the fastening member threadably engages an external thread engraved on the circumference of the upper end of the steering stem to abut and engage the bottom.

7. The saddled vehicle according to claim 6, wherein the locking member is a pin-like member that has an axis on the imaginary plane and protrudes from the handle locking device to the retaining recess.

8. The saddled vehicle according to claim 2, wherein
the front fork includes a pair of cushion units that extends parallel to the steering stem and is placed on the left and right of a front wheel, and
the top bridge has a pair of left and right fork supports that couples upper ends of the cushion units and has the drainage hole that is offset rearward from rear ends of the pair of left and right fork supports when the vehicle moves straight forward.

9. The saddled vehicle according to claim 3, wherein
the front fork includes a pair of cushion units that extends parallel to the steering stem and is placed on the left and right of a front wheel, and
the top bridge has a pair of left and right fork supports that couples upper ends of the cushion units and has the drainage hole that is offset rearward from rear ends of the pair of left and right fork supports when the vehicle moves straight forward.

10. The saddled vehicle according to claim 4, wherein
the front fork includes a pair of cushion units that extends parallel to the steering stem and is placed on the left and right of a front wheel, and
the top bridge has a pair of left and right fork supports that couples upper ends of the cushion units and has the drainage hole that is offset rearward from rear ends of the pair of left and right fork supports when the vehicle moves straight forward.

* * * * *